United States Patent [11] 3,633,129

[72] Inventors Chih-yu Kao
Lawrence;
Carl Ferdinand Kurth, Andover, both of Mass.; Roderick Campbell MacLean, Atkinson, N.H.

[21] Appl. No. 80,073
[22] Filed Oct. 12, 1970
[45] Patented Jan. 4, 1972
[73] Assignee Bell Telephone Laboratories, Incorporated Murray Hill, N.J.

[54] AUTOMATIC EQUALIZER UTILIZING A PREDETERMINED REFERENCE SIGNAL
11 Claims, 4 Drawing Figs.

[52] U.S. Cl. 333/18, 307/264, 307/269, 307/295
[51] Int. Cl. H04b 3/04
[50] Field of Search 333/18, 28, 70 T

[56] References Cited
UNITED STATES PATENTS

| | | | |
|---|---|---|---|
| 3,375,473 | 3/1968 | Lucky | 333/18 |
| 3,508,172 | 4/1970 | Kretzmer et al. | 333/18 |
| 3,573,667 | 4/1971 | Kao et al. | 333/18 |

*Primary Examiner*—Herman Karl Saalbach
*Assistant Examiner*—Paul L. Gensler
*Attorneys*—R. J. Guenther and William L. Keefauver

ABSTRACT: An equalizer of a coaxial transmission system is automatically adjusted by applying a sweep signal to the equalizer and comparing the output of the equalizer with a predetermined reference signal to develop an error signal. The output signal of the equalizer is simultaneously converted into a train of pulses and applied to a frequency selector which generates signals upon the occurrence of predetermined frequencies in the equalizer output signal. In response to these generated signals, predetermined intervals of the error signal are integrated, converted to digital signals, and applied to the proper "memory" of the equalizer.

INVENTORS C. KAO
C.F. KURTH
R.C. MAC LEAN
BY Gerard E. Murphy
ATTORNEY

AUTOMATIC EQUALIZER UTILIZING A PREDETERMINED REFERENCE SIGNAL

BACKGROUND OF THE INVENTION

1. Field of the Invention

This invention pertains to signal transmission systems and, more particularly, to equalizing apparatus for such systems.

Signal transmission systems, particularly those which transmit a broadband signal over a considerable distance, suffer from transmission imperfections. These imperfections are present because of the impossibility of exactly anticipating what variations in gain or phase will be encountered when the system is in use. Fixed equalizers may be designed which nominally correct for variations in the transmission characteristics of the system; however, transmission is also a function of ambient temperature and other unpredictable parameters. It is therefore necessary to provide, in the system, equalizing networks which can be adjusted to compensate for imperfections not corrected by fixed equalizers.

2. Description of the Prior Art

A typical equalizer system is described in the Bell Laboratories Record, July-Aug. 1967 at page 231. An equalizer in such a system comprises a plurality of amplifier networks, each individually adjustable and exhibiting a transmission characteristic having a "bump" shape. The respective transmissibility of each amplifier network is adjusted by the use of discrete test signals or tones, one per transmission characteristic, i.e., "bump." This technique, though eminently satisfactory in certain applications, has, in other applications, shortcomings which arise because of the reliance upon only one discrete test signal per equalizer network frequency band. It is an object of this invention to overcome this limitation.

In copending application Ser. No. 864,664, filed Oct. 8, 1969 by C. Kao and C. F. Kurth, now Pat. No. 3,373,667, analog apparatus using band-pass filters is disclosed for overcoming this limitation. In order to insure proper discrimination and satisfactory filter transition regions, filters of high order are required. This requirement is avoided in the present invention.

SUMMARY OF THE INVENTION

In accordance with the principles of this invention, a test sweep signal, of constant amplitude and spectrum coextensive with the signal transmission band, is applied to the equalizer which is to be adjusted. The output signal of the equalizer is compared with a predetermined reference signal to develop an error signal, and is simultaneously converted into a train of pulses representative of the frequency of the output signal. A frequency selector, responsive to the pulse train, generates control signals upon the occurrence of predetermined frequencies in the equalizer output signal. Apparatus actuated by these control signals integrates the error signal over a specified "bump" frequency range, converts the integrated error signal into a digital signal, and applied this digital signal to the proper "memory" of the equalizer to adjust the corresponding bump.

DETAILED DESCRIPTION OF THE INVENTION

The automatic equalizer apparatus of this invention finds particular use in long-haul cable transmission systems such as the Bell System L-4 Coaxial Cable System described in the *Bell Laboratories Record*, July-Aug. 1967, and the *Bell System Technical Journal*, Vol. 48, Apr. 1969. In such systems an equalizer, commonly known as an "A" or "B" equalizer, is used to provide the adjustable gain necessary for correcting gain deviations that remain after the operation of other, less complex, regulating repeaters. These gain deviations arise from both the random effects of line repeater manufacturing tolerances and from variations caused by changes in repeater temperature.

Figure 2:
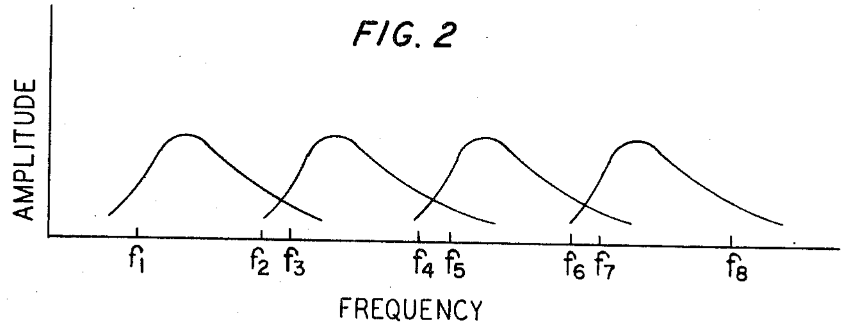
FIG. 2 illustrates the transmission band characteristics, i.e., "bumps," of the equalizer used in the apparatus depicted in FIG. 1.

An equalizer, e.g., may consist of four amplifiers located in the signal transmission path. Amplifier gains are controlled by six independently adjustable equalizer networks, each affecting a different band of frequencies within the signal band spectrum. The transmission characteristics of the networks, as shown in FIG. 2, may overlap and are generally referred to as "bumps," because of their shape. They are to be distinguished from other equalizer transmission characteristics such as cosine shapes, etc. Bump shapes can be achieved by relatively simple Bode equalizer network sections and offer attractive advantages over cosine shapes with respect to realization and ease of adjustment. The equalizer network bands overlap so as to provide adjustment throughout the signal spectrum. Each equalizer network's influence on the transmitted signals is controlled by the impedance of a thermistor (a temperature-sensitive resistor) which is varied by changing the value of a direct current flowing through a heating element. Adjustment of the network, therefore, requires only setting the proper heater current. Memory circuits, remotely and manually adjusted at predetermined discrete frequencies or tones, one tome per equalizer bump, in response to applied digital control signals, establish the controlling heater currents. Further detailed discussion of such equalizers may be found on page 889 of the above-cited *Bell System Technical Journal*.

It is noted that the above-described equalizer system uses only one discrete test tone per equalizer network transmission characteristic, i.e., bump. It has been found that though such a scheme is satisfactory, it does not achieve the desired level of accuracy, over the entire signal band, required in certain communication systems. Thus, it is the primary object of this invention to adjust the transmission characteristics of equalizers, of the type described, over substantially the entire signal spectrum.

Figure 1:
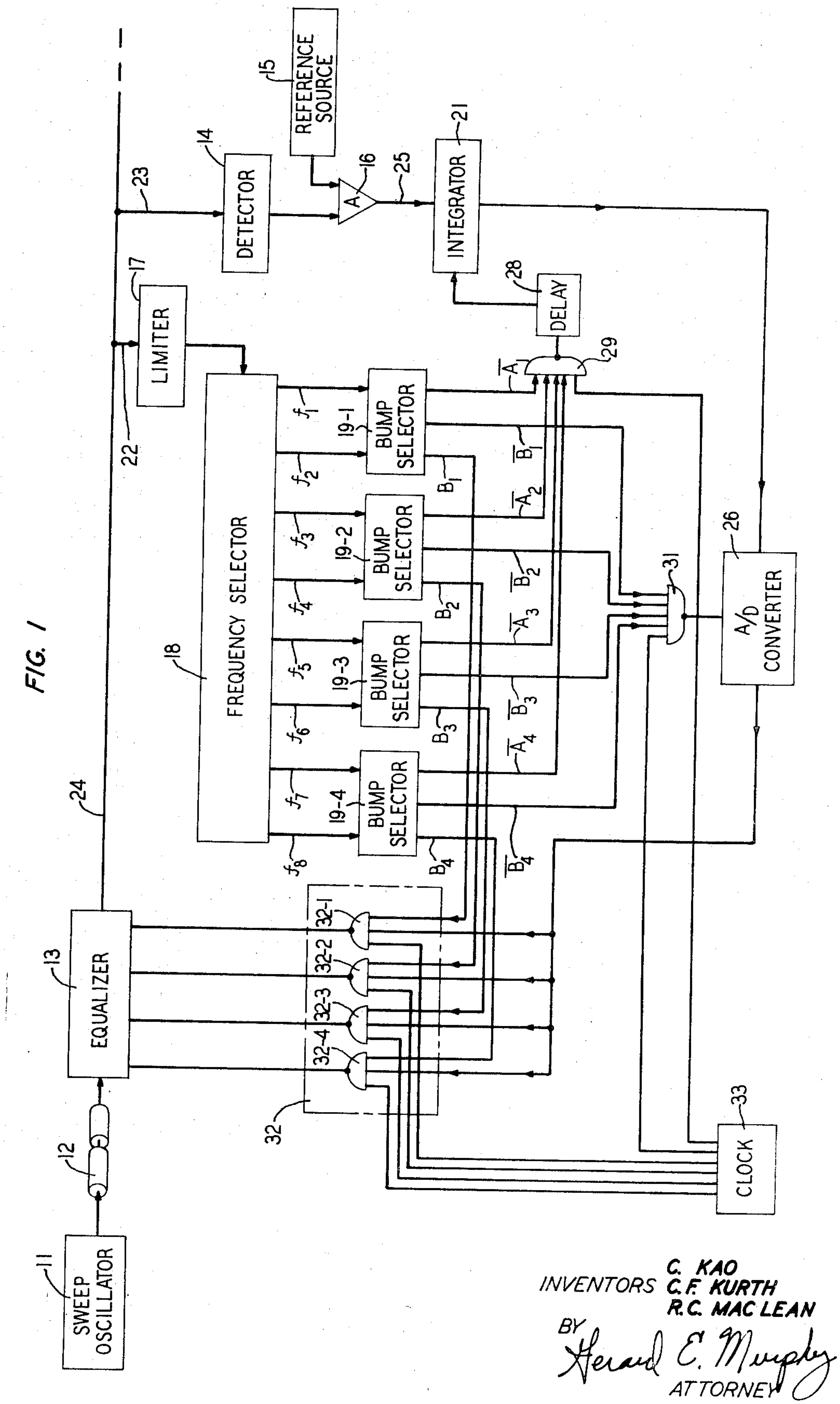
FIG. 1 is a block diagram of an illustrative embodiment of the equalizer apparatus of this invention.

In accordance with this invention, as shown in FIG. 1, sweep oscillator 11, of any well-known construction, applies a test sinusoidal sweep frequency signal of constant amplitude to cable transmission path 12. If the bumps of the equalizer are symmetrical with respect to frequency on a logarithmic scale, the sweeping frequency is preferably an exponential function of time rather than a linear function. This operation requires that the individual cable and equalizer, which is being adjusted, be taken out of service and a spare cable and equalizer be switched in, to continue service. Since this need occur only on the average of one or two times a year, no serious detrimental effects result. The spectrum of the test sweep signal is coextensive with the transmission band of the system under test, e.g., 80 kHz. to 155 kHz. The test signal is conveyed by coaxial cable 12 and applied to equalizer 13. Equalizer 13 may be any well-known bump-type equalizer such as the above-described "A" or "B" equalizer. Illustratively, it is assumed that equalizer 13 has four bumps, i.e., adjustable network transmission characteristics, as depicted in FIG. 2. The test signal after modification by equalizer 13 is conveyed via lines 24 and 23 to detector 14. Of course, main line 24, which is normally connected to the next cable length of the system is disconnected therefrom. Detector 14, e.g., a rectifier, develops a signal proportional to the energy content of the equalized signal. This proportional signal is compared in difference amplifier 16 with a reference signal of predetermined amplitude corresponding to the desired optimum level of signal transmission. Source 15, which supplies the reference signal, may be of any well-known construction. The difference or error signal developed by amplifier 16 is supplied via line 25 to integrator 21.

Simultaneous with the above-described operation, the output signal emanating from equalizer 13 is also applied, via line 22, to limiter 17 which clips the equalized sinusoidal sweep signal and converts it into a train of pulses. Pulse signals emanating from limiter 17 are supplied to frequency selector 18 to develop control signals at predetermined frequencies associated with each bump of FIG. 2.

Frequency selector 18, described in detail hereinafter, is basically a binary counter which is reset to zero after each predetermined sampling interval, e.g., one millisecond. Since the number of pulses applied by limiter 17 to selector 18 in a fixed interval of time is representative of the frequency of the applied signal, selector 18 counts the number of pulses and generates control signals at counts associated with predetermined bump frequencies. The predetermined frequencies correspond to the lower and upper limits of the effective range of each bump. For example, a control signal indicative of a frequency of $f_1$ is generated and applied to bump selector 19—1 when the equalizer output signal is equal to $f_1$. It will be noted from FIG. 2 that $f_1$ corresponds to the effective lower limit of the first bump. Similarly, when the effective upper frequency $f_2$ of the first bump is reach by the equalizer output signal, a second frequency control signal is generated by selector 18 and applied to bump selector 19—1. The operation of bump selectors 19 will be discussed in detail below.

As the signal on line 24 increases in frequency, control signals at frequencies $f_3$, $f_4$, defining the second bump, $f_6$, $f_7$, defining the third bump, and $f_7$, $f_8$, defining the fourth bump, are applied to bump selectors 19—2, 19—3, and 19—4, respectively. Each bump selector 19 has three signal outputs, $\overline{A}$, $\overline{B}$, B, which are applied, respectively, to NAND-gates 29, 31, and memory selector NAND-gates 32. Clock 33, a conventional timing signal generator, applies synchronizing pulses, e.g., at a frequency of 250 kHz., to the NAND gates. Thus, when a prescribed frequency is reached by the equalizer output signal, one of bump selectors 19 enables NAND-gate 29, NAND-gate 31, and one of NAND-gates 32. The signal emanating from NAND-gate 29 after a short delay, e.g., 4 milliseconds, introduced by network 28, is applied to integrator 21. Delay unit 28 may be a conventional monostable multivibrator and serves to allow sufficient time for converter 26 to be properly activated prior to the activation of integrator 21. Thus, for example, when a signal of frequency $f_1$ is present in the equalizer output, integrator 21 is turned on via bump selector 19—1 and gate 29, and proceeds to integrate the error signal on line 25. When a frequency $f_2$ is attained by the equalizer output signal, NAND-gate 29 is again enabled by bump selector 19—1 and integrator 21 is discharged. Accordingly, the output signal of integrator 21 corresponds to the integral of the equalization error over a specified range of the frequency band, i.e., the effective range of one of the bumps of FIG. 2. Integrator 21 may be a standard operational amplifier-RC network configuration, with a switch connected across the integrating capacitor to turn the integrator on and off in response to the applied control signals of NAND-gate 29. The integrated error signal is applied to analog-digital (A/D) converter 26 which has been activated by a signal applied by the appropriate bump selector, e.g., 19—1, to NAND-gate 31. Converter 26, which may be of any conventional type, converts the integrated error signal output of integrator 21 into a digital signal for application to the "memory" circuitry of equalizer 13. Of course, equalizer 13 may be modified to accept analog control signals; in this case, A/D converter 26 is not required. The digital signal developed by converter 26 is applied to the correct memory circuit of equalizer 13 by one of memory selector NAND-gates 32 which has been activated by a signal applied by the appropriate bump selector, e.g., 19–1.

In summary, the output signal of equalizer 13 is applied to limiter 17 which transforms the signal into a pulse train of the same frequency. The pulse train is then applied to frequency selector 18 which is periodically reset to zero after a predetermined sampling interval. As the equalizer output signal is swept through a wide frequency band, selector 18 counts the number of pulses applied to it during the sampling interval. When a prescribed frequency is reached, for example, the lower or upper effective frequency of a bump, a pulse is generated by selector 18 activating a particular bump selector 19. The bump selector, in turn, activates integrator 21, A/D converter 26 and memory selector 32. The error signal on line 25 is therefore integrated, converted, and applied to the appropriate "memory" of equalizer 13.

Figure 3:
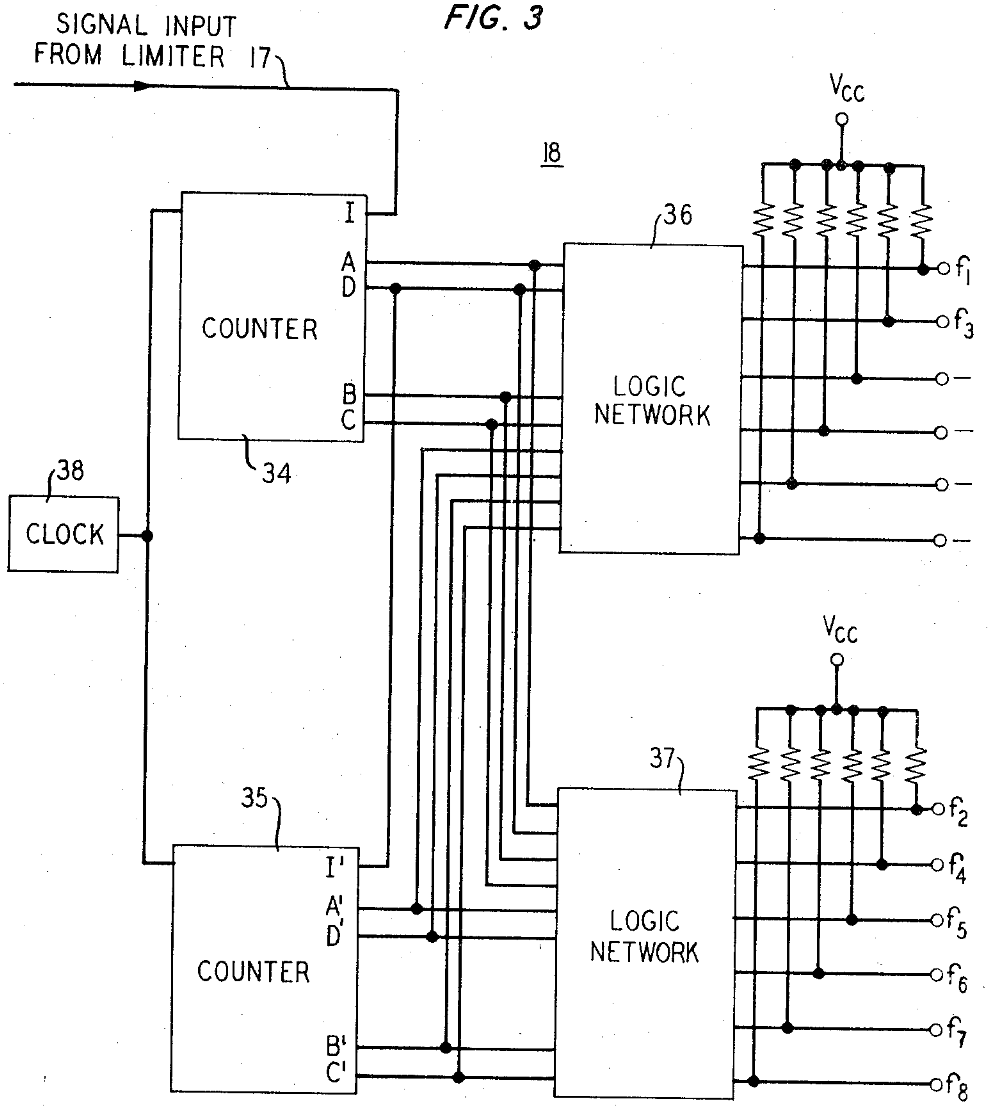
FIG. 3 illustrates a frequency selector used in the apparatus of FIG. 1.

Frequency selector 18, FIG. 3, comprises binary counters 34 and 35 and logic networks 36 and 37. In an illustrative embodiment of this invention, four bumps are used in equalizer 13, identified by control frequencies of $f_1$, 84 kHz., $f_2$, 94 kHz., $f_3$, 99 kHz., $f_4$, 111 kHz., $f_5$, 116 kHz., $f_6$, 130 kHz., $f_7$, 136 kHz., and $f_8$, 153 kHz. The frequency ranges between 94 and 99 kHz., 111 and 116 kHz., and 130 and 136 kHz. are not included since the bumps of FIG. 2 have minimal effect in these ranges.

Binary counters 34 and 35 are reset to zero at the termination of each sampling interval, e.g., 1 millisecond, by signals applied by sampling clock 38. The train of pulses from limiter 17 of FIG. 1 is applied to the I terminal of counter 34. Counters 34 and 35 may be conventional 4-bit counters which provide at their respective logic output terminals (A, B, C, D, and A', B', C', and D') a count of $2^0$, $2^1$, $2^2$ and $2^3$. The D-output of counter 34 is applied to the I' input of counter 35. Thus, for example, a frequency $f_1$ of 84 kHz. is indicated to be present when a signal appears at terminal C, $2^2$, of counter 34 and terminals A', $2^4$, and C', $2^6$, of counter 35. Stated another way, a count of 84 pulses (4+16+64) in 1 millisecond, i.e., the sampling interval, corresponds to an input signal frequency of 84 kHz. Similarly, 94 pulses will have been counted in 1 millisecond when signals appear at terminals B, $2^1$, C, $2^2$, and D, $2^3$, of counter 34 and A', $2^4$, and C', $2^6$, of counter 35. As will be apparent to one skilled in the art, the bump defining frequencies will be indicated by various combinations of signals appearing at the output terminals of counters 34 and 35. To indicate the coincidence of signals on various output terminals, it is conventional to apply such signals to an AND gate. Thus, when signals appear on terminals C, A', and C', an AND gate connected to those terminals will develop an output signal indicating the presence of a signal frequency of 84 kHz. This logical combination of signals may be accomplished by a plurality of gate circuits, each connected to selected terminals of counters 34 and 35, or what is effectively the same thing, by use of commercially available diode matrix AND gate networks, as indicated by networks 36 and 37. A diode matrix network contains diodes with rows of common connected cathodes and columns of common connected anodes. The first number in a matrix diode identification indicates the number of rows and the second number indicates the number of columns; an 8×6 AND gate matrix has been found suitable for use in each of logic networks 36 and 37. Thus, signals appearing on the output terminals of logic networks 36 and 37 indicate the presence of a signal at the identified bump control frequencies. Additional frequencies may also be indicated by the unused output terminals of network 36.

Figure 4:
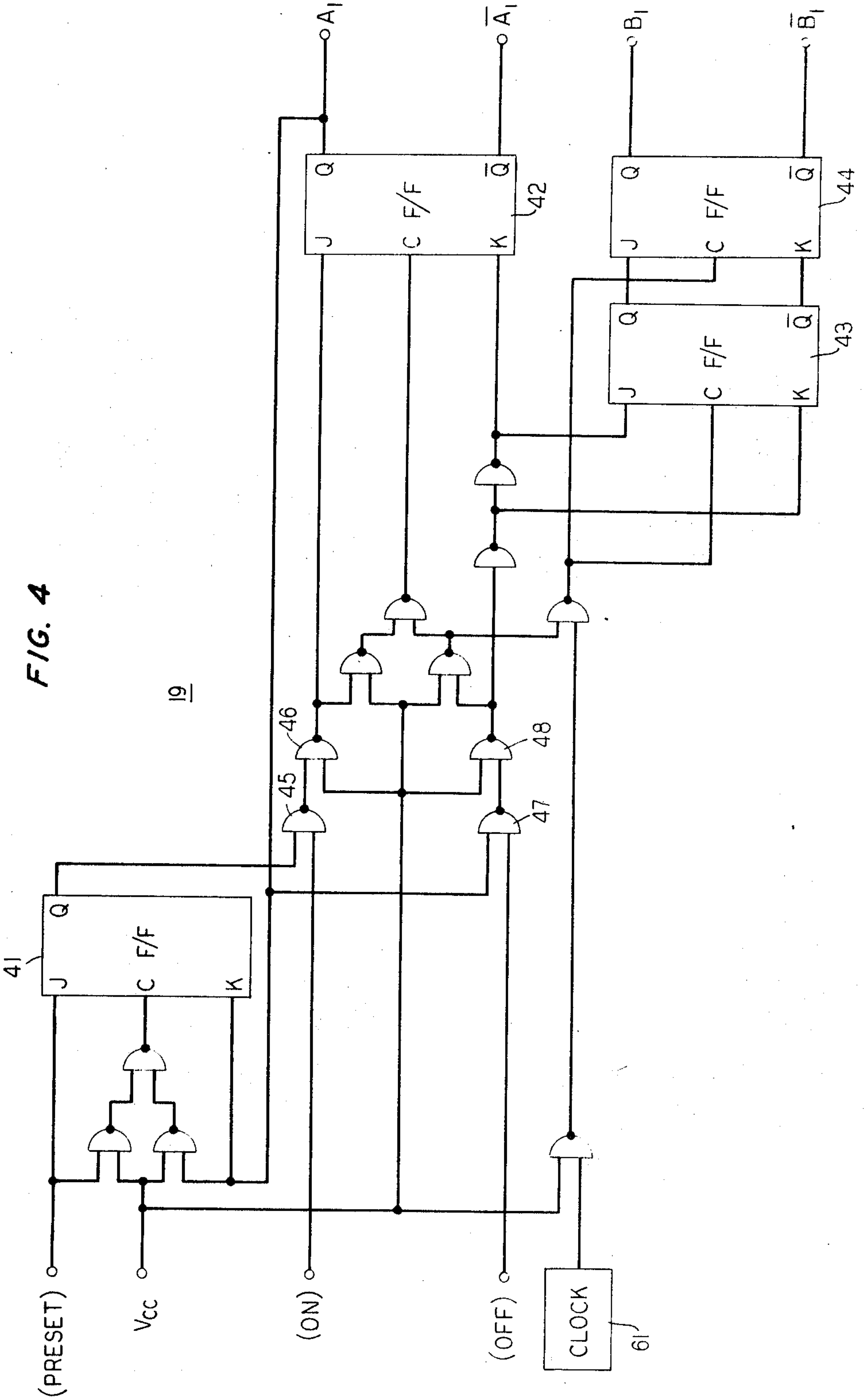
FIG. 4 illustrates a bump selector used in the apparatus of FIG. 1.

The output terminals of logic networks 36 and 37 are connected to bump selectors 19–1, 19–2, etc., as shown in FIG. 1. An exemplary bump selector 19 is depicted in FIG. 4. The function of a bump selector, as discussed above, is to develop signals $\overline{A}$, $\overline{B}$, and B which control integrator 21, A/D converter 26, and memory selector 32. IN the following discussion, the signal level on a particular lead, or the state of a bistable multivibrator, i.e., flip-flop (F/F), will be identified, conventionally, as being either logical zero or logical one. Assuming that output $A_1$ of F/F 42 is logical zero, then the K input of F/F 41 is likewise zero. A pulse applied to the designated preset terminal of F/F 41, for example, by sweep oscillator 11, FIG. 1, at the commencement of a sweep, this conventional connection not being shown, is conveyed to the J and C inputs of F/F 41. The Q output F/F 41 accordingly changes from logical zero to logical one, thereby enabling NAND-gate 45 to transmit a frequency control signal, e.g., $f_1$, applied to the designated ON terminal. NAND-gate 46, in turn, conveys the applied control signal to the J-input of F/F 42, thereby causing the Q-output of F/F 42, $A_1$, to change state from one to zero, and the $\bar{Q}$ output $\bar{A}_1$, to change state from one to zero. The signal present at the Q output of F/F 42 enables NAND-gate 47, preparing it for reception of the frequency control signal, $f_2$, applied to the designated OFF terminal. The Q-output of F/F 42 also resets the Q-output of F/F 41 to logical zero, via F/F 41 input K, thereby inhibiting gate 45 from passing subsequent ON signals. A signal applied to the OFF terminal by frequency selector 18, FIG. 1, is conveyed to the K-input of F/F 47, thereby making the bump selector nonreceptive to subsequent frequency control signals applied to the OFF terminal. Upon the receipt of another preset pulse, of course, the circuit is enabled and the sequence of operations described is repeated. The OFF frequency control signal, e.g., $f_2$, at the output of NAND-gate 48 also causes F/F 43 to change state, which in turn activates F/F 44, thereby generating signals $\bar{B}_1$ and $B_1$ for control of A/D converters 26 and memory selector 32 of FIG. 1. Clock 61, of course, is conventional and merely generates synchronizing signals for the various logic circuits at a frequency, e.g., of 2 kHz. F/F 43 and F/F 44 are clocked so that A/D converter 26 and memory selector 32 are enabled for a suitable time duration, e.g., 0.5 milliseconds.

What is claimed is:

1. Apparatus for adjusting an equalizer, excited by an applied signal, having a plurality of adjustable transmission networks comprising:
   means for developing an error signal corresponding to the difference between an output signal developed by said equalizer and a predetermined reference signal;
   means responsive to said output signal for developing a plurality of control signals representative of the effective frequency range of predetermined passbands of said equalizer;
   means responsive to said control signals for integrating said error signal;
   and means responsive to said control signals for selectively applying said integrated error signal to said equalizer transmission network.

2. The apparatus of claim 1 wherein said means for developing a plurality of control signals comprises:
   limiter means for developing a train of pulses in response to said output signal;
   binary counter means responsive to said train of pulses for developing signals indicative of the number of applied pulses;
   and logic means responsive to the signals of said binary counter means for developing said control signals upon the occurrence of predetermined signal frequencies in said output signal.

3. Apparatus responsive to the output signal of an equalizer for adjusting said equalizer comprising:
   means for developing an error signal corresponding to the difference between said output signal and a predetermined reference signal;
   means responsive to said output signal for developing a plurality of pairs of frequency control signals, each pair of signals representing the effective frequency range of a predetermined passband of said equalizer;
   means responsive to said control signals for integrating said error signals;
   means responsive to said control signals for converting said integrated error signal into a digital signal;
   and means responsive to said control signals for selectively applying said digital signal to said equalizer transmission networks.

4. The apparatus of claim 3 wherein said means for developing a plurality of pairs of frequency control signals comprises:
   means for developing a train of pulses in response to said output signal;
   counter means for developing signals indicative of the number of pulses in said train;
   and logic means responsive to the signals of said counter means for developing said control signals upon the occurrence of predetermined signal frequencies in said output signal.

5. Apparatus for adjusting an equalizer, excited by a swept frequency signal, having a plurality of adjustable transmission networks comprising:
   means for developing an error signal corresponding to the difference between an output signal developed by said equalizer and a predetermined reference signal;
   means responsive to said output signal for developing a plurality of pairs of frequency control signals, each pair of signals representing the effective frequency range of a predetermined passband of said equalizer;
   means for integrating said error signal;
   means for converting said integrated error signal into a digital signal;
   means for selectively applying said digital signal to said equalizer transmission networks;
   and means responsive to said pairs of frequency control signals for selectively activating said integrating means, said converting means, and said applying means.

6. In a transmission system wherein an equalizer, having a plurality of adjustable transmission networks, develops an output signal in response to an applied signal, the combination comprising:
   means for developing an error signal corresponding to the difference between said output signal and a predetermined reference signal;
   means for developing a plurality of control signals in response to said output signal; means responsive to said control signals for integrating said error signals over predetermined frequency intervals;
   and means responsive to said control signals for selectively applying said integrated error signal to said equalizer transmission networks.

7. The combination of claim 6 wherein said means for developing a plurality of control signals comprises:
   means for developing a train of pulses having the same periodicity as said output signal;
   counter means responsive to said train of pulses for developing signals indicative of the signal frequencies of said output signal;
   and logic means responsive to said indicative signals for developing said control signals upon the occurrence of predetermined signal frequencies in said output signal.

8. In a transmission system wherein an equalizer, having a plurality of adjustable transmission networks, develops an output signal in response to an applied signal, the combination comprising:
   means for developing an error signal corresponding to the difference between said output signal and a predetermined reference signal;
   means responsive to said output signal for developing a plurality of control signals upon the occurrence of predetermined signal frequencies in said output signal;
   means responsive to said control signals for integrating said error signal over predetermined frequency intervals;
   means for converting said integrated error signal into a digital signal;
   and means responsive to said control signals for selectively applying said digital signal to said equalizer transmission networks.

9. The combination of claim 8 wherein said means for developing a plurality of control signals comprises:
   limiter means for developing a train of pulses in response to said output signal;
   binary counter means responsive to said train of pulses for developing signals indicative of the signal frequencies of said output signal;
   and logic means responsive to the signals of said binary counter means for developing said control signals.

10. In a transmission system wherein an equalizer, having a plurality of adjustable transmission networks, develops an output signal in response to an applied signal, the combination comprising:

means for developing an error signal corresponding to the difference between said output signal and a predetermined reference signal;

means for converting said output signal into a train of pulses;

means for developing a plurality of frequency control signals in response to said train of pulses;

means for developing a plurality of logic control signals in response to said frequency control signals;

means responsive to said logic control signals for integrating said error signal over predetermined frequency intervals;

means responsive to said logic control signals for converting said integrated error signal into a digital signal;

and means responsive to said logic control signals for selectively applying said digital signal to said equalizer transmission networks.

11. The combination of claim 10 wherein said means for developing a plurality of frequency control signals comprises:

binary counter means responsive to said train of pulses for developing signals indicative of the frequency of said output signal;

and network means responsive to the signals of said binary counter means for developing said control signals upon the occurrence of predetermined signal frequencies in said output signal.

* * * * *